United States Patent
Klink

[11] 3,802,642
[45] Apr. 9, 1974

[54] AUTOMATIC WINDING DEVICE FOR SAFETY BELTS IN MOTOR VEHICLES

[76] Inventor: Wolf-Dieter Klink, Danziger Weg 520, 7071 Lindach, Germany

[22] Filed: Nov. 29, 1971

[21] Appl. No.: 202,923

[30] Foreign Application Priority Data
Nov. 30, 1971 Germany............................ 2058883
Dec. 31, 1971 Germany............................ 2064710

[52] U.S. Cl............................. 242/107.4, 297/386
[51] Int. Cl....................... A62b 35/02, B65h 63/04
[58] Field of Search.......... 242/107.4, 107 R, 107.2, 242/107.3; 297/386, 387, 388; 280/150 SB; 16/75, 76, 77; 267/57, 154

[56] References Cited
UNITED STATES PATENTS

| | | | |
|---|---|---|---|
| 3,323,749 | 6/1967 | Karlsson | 242/107.4 |
| 3,495,786 | 2/1970 | Hemens | 242/107.4 |
| 3,478,981 | 11/1969 | Barecki et al. | 242/107.4 |
| 3,203,641 | 8/1965 | McFarlane et al. | 242/107.4 |
| 3,666,198 | 5/1972 | Neumann | 242/107.4 |
| 3,081,991 | 3/1963 | Swainson | 267/154 |
| 3,561,690 | 2/1971 | Muskat | 297/386 X |

*Primary Examiner*—Stanley N. Gilreath
*Assistant Examiner*—Jon W. Henry
*Attorney, Agent, or Firm*—Arthur E. Wilfond

[57] ABSTRACT

Automatic winding device for safety belts in a motor vehicle to protect occupants has a housing fixedly mounted in the vehicle and a toothed disc fixed to the housing.

A belt drum is rotatably mounted in the housing for unwinding a belt wound thereon; and a blocking disc is joined to the belt drum. The blocking disc has an end face and includes a set of teeth on this end face as well as a plurality of engagement bevels disposed between the teeth respectively. A coupling disc is rotatably mounted coaxially to the blocking disc and has two end faces with first and second sets of teeth disposed on respective ones of the two end faces. The coupling disc is axially displaceable with respect to the blocking disc between inactive and active positions. The first set of teeth are engageable with the teeth of the blocking disc in the inactive position and the coupling disc is rotatable relative to and moveable axially of the blocking disc to the active position when said blocking disc rotates at a speed greater than a given rate. The second set of teeth of the coupling disc is engageable with the toothed disc of the housing in the active position to block further unwinding of the belt wound on the belt drum.

Also, a pendulum brake is disposed at the periphery of the coupling disc for braking and deflecting the disc in response to sudden, sharp movements of the vehicle to effect engagement of the second set of teeth of the coupling disc with the toothed disc of the housing so as to block rotation of the belt drum.

10 Claims, 5 Drawing Figures

AUTOMATIC WINDING DEVICE FOR SAFETY BELTS IN MOTOR VEHICLES

The invention relates to an automatic winding device for safety belts in motor vehicles comprising a belt drum which is rotatably pivoted in a housing fixedly attached in the vehicle. The belt drum is either rigidly connected with a blocking disc, or is connected to the disc through energy-converting coupling members. The end face of the blocking disc comprises a set of teeth with receiving inclines between the individual teeth. These teeth are engaged by a first set of teeth on one end face of a coupling disc which is coaxially positioned and is arranged axially shiftable and rotatable relative to the blocking disc, the teeth of the first set being counter to the teeth on the blocking disc. The other end face of the coupling disc comprises a second set of teeth which, when the coupling disc is rotated relative to the blocking disc, is caused by the resulting axial displacement, to engage a toothed disc that is rigidly connected with the housing thus blocking the belt drum.

The belt drum of such an automatic winding device should be blocked in response to speed changes occurring because of a short stop or accident. A blocking of the belt drum should occur when there is a frontal, lateral or rear impact, a somersaulting of the vehicle, as well as when the belt is unwound at high speed.

It is an object of the invention to provide an automatic winding device which will block the belt drum automatically during all accident-conditioned actions that require that occupants of the vehicle be protected by safety belts.

According to a feature of the invention, the coupling disc is provided with a pendulum brake comprising a brake ring surrounding the coupling disc and pendular bearing means for bearing the ring in self-aligning bearing relation to the coupling disc. On the upper half of the brake ring, preferably in symmetrical distribution, two of the wedge-type brake shoes are arranged which are adjusted to the circumferential surface of the coupling disc. The coupling disc in turn is provided with a set of teeth on its circumferential surface. According to a further feature of the invention, the pendular bearing means comprises a vertically oriented longitudinal opening which forms the pivot pendulum bearing and through which extends a bearing pin that is affixed to the housing and extends parallel to the axis of the belt drum. A spiral spring is mounted on the bearing pin and both its ends engage the brake ring at different sides of the bearing to hold the brake ring in a suspended condition.

The pendulum brake arranged in accordance with the invention responds not only to extreme accelerations due to real impacts and exceptional deceleration due to the heavy braking or frontal impacts, but acts also during lateral impact or when the vehicle turns over.

If, despite this safety guarantee, the belt should unwind at an accelerated speed, the belt drum would also be blocked, since, in this case, the braking effect of the pendulum brake would be substituted by the inertia of the coupling disc.

The safety of the response of the pendulum brake is additionally increased, if the braking ring is provided with additional pendulum weights at its lower half or, more specifically, in the area which lies opposite the pivot bearing.

Since the automatic winding device is installed in various positions, depending on the type of vehicle, the bearing pin which supports the brake ring can be selectively installed at various places of the housing, within the circumference region of the coupling disc, so that it can be utilized in the position having the optimum effect depending on the installation position of the automatic winding device.

According to still another feature of the invention, an automatic winding device of the afore-described type is provided in a simple manner with an energy converter for dampening, in the event of danger, the belt forces which act upon the body of a person strapped-down. A torsion rod is inserted as an energy-absorbing member between the belt drum and the rotatable coupling part and/or between the bearing block and the stationary coupling portion. A particularly preferred embodiment of an automatic winding device of the invention is obtained by installing a torsion rod in the hollow space of the belt drum.

Tests have shown that when automatic winding devices with energy converters according to the invention, are used, in the event of danger, the stress to the body of the strapped-down person remains within harmless limits. Particularly, the whiplash effect which can cause a broken neck is largely eliminated.

Another advantage of the energy converter of the invention, besides the elimination of need for adjusting, lies in the fact that its effectiveness is completely independent of outside influences such as dirt, humidity and the like.

Although the invention is illustrated and described herein, as an automatic winding device for safety belts in motor vehicles, it is nevertheless not intended to be limited to the details shown, since various modifications may be made therein within the scope and the range of the claims. The invention, however, together with additional objects and advantages will be best understood from the following description and in connection with the accompanying drawings in which:

Figure 1:
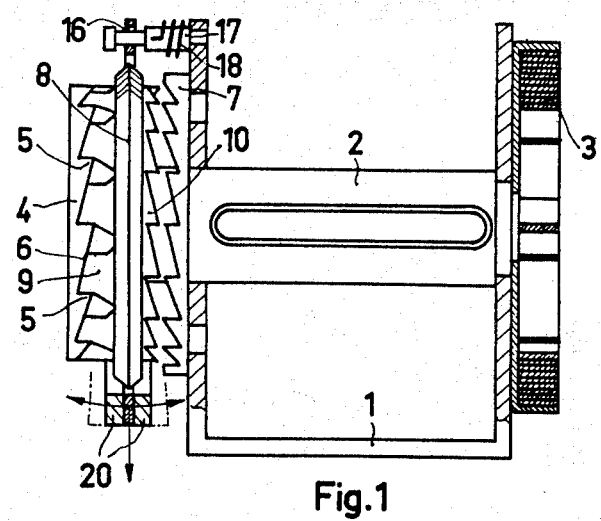
FIG. 1 is a front view, partly in section, of an automatic winding device according to the invention.

A belt drum 2 is rotatably pivoted in a yoke-shaped housing 1. One end of the belt drum 2 is engaged by a return spring 3, while the other end is rigidly connected with a blocking disc 4, or the other end can be connected to the latter by means of energy-absorbing coupling members (not shown in drawing). The blocking disc 4 has a set of teeth 5 on its inside face and arresting inclines 6 are arranged between the individual teeth. On the side opposite the teeth 5, a toothed disc 7 is non-rotatably affixed on the housing 1. A coupling disc 8 is coaxially positioned between the blocking disc 4 and the toothed disc 7. Disc 8 is axially displaceable and is rotatably pivoted and has respective sets of teeth 9 and 10 on its side faces. In its rest position, the coupling disc 8 abuts with its teeth 9 against the arresting inclines 6 of the blocking disc 4, so that its teeth 10 do not mesh with the toothed disc 7.

This fact makes it possible to slowly unwind the belt 11 from the belt drum 2, the belt being wound on the latter; this enables the occupant protected by the belt to stretch and reach objects inside the vehicle without having to first loosen the belt. As soon as the occupant returns to his original position, the belt 2 is again wound upon the belt-drum 2 because of the action of the return spring 3 which is tensioned when the belt is unwound.

If the belt is unwound at a speed greater than a predetermined rate, the coupling disc 8 will rotate slower than the blocking disc 4 because of inertia and will be urged toward the toothed disc 7 and become engaged therewith. This blocks the belt drum 2 and prevents a further unwinding of the belt because now the two sets of teeth on respective end faces of the coupling disc 8 engage respectively the teeth of the blocking disc 4 as well as the toothed disc 7. In this case, the unwound belt will be rewound by the action of the spring 3, as soon as it is released.

Figure 3:
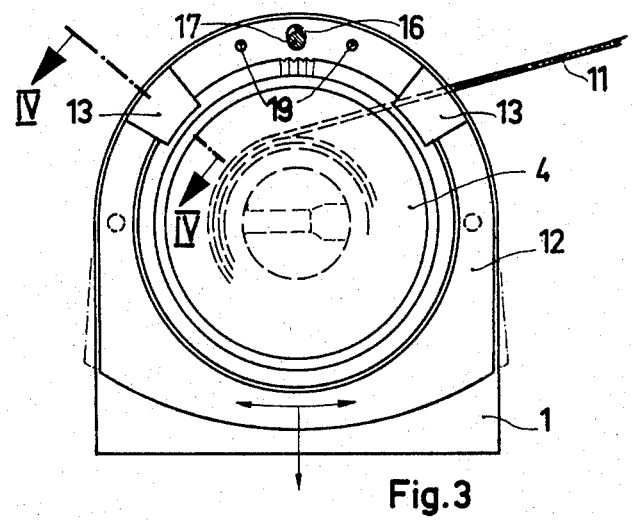
FIG. 3 is an elevation view of the device of FIG. 1.
Figure 4:
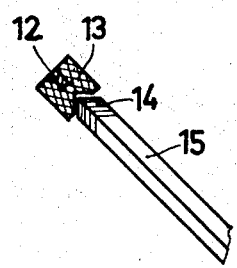
FIG. 4 is a view of the brake ring, partly in section, in the region of a brake shoe taken at line IV—IV of FIG. 1; and, FIG. 5 is an automatic winding device of FIG. 1 equipped with a torsion rod.

To brake the coupling disc 8 upon the occurrence of extreme changes in speed or during impacts, a pendulum brake is provided comprising a brake ring 12 which encloses the coupling disc 8 around its periphery and has two symmetrically arranged brake shoes 13 at its upper half, as illustrated in FIG. 3. The brake shoes 13 are made of elastic material and their braking surface is configured to the wedge-like circumferential area 15 of the coupling disc 8, the area being provided with teeth 14, preferably a serrated surface. In its zenith area, the brake ring 12 has a vertically oriented longitudinal hole 16 through which projects a bearing pin 17 that extends parallel to the axis of the belt drum 2 and is affixed to the housing 1.

Mounted upon the bearing pin 17 is a spiral spring 18 whose end turns 19 are bent to extend angle-like to engage the brake ring 12, on different sides of the longitudinal hole 16 so as to spring support the brake ring 12 so that the ring 12 can freely vibrate in the manner of a physical pendulum, in the plane of the ring as well as transverse thereto. The pendulum vibrations are dampened by the spring 18. In addition to pendulum vibrations, vibrations in the direction of the longitudinal hole 16 are also possible. The response threshold of the pendulum brake may be determined, firstly, by the spring constant of the helical spring 18 and, secondly, by properly dimensioning additional pendulum weights 20, which are preferably arranged on the side of the brake ring 12 that lies opposite to the longitudinal hole 16.

Upon the occurrence of speed changes which exceed a predetermined rate, as well as during an impact and/or turn-over of the vehicle, the pendulum brake deflects in the appropriate direction to cause at least one of the brake shoes 13 to be applied in braking relation to the coupling disc 8 independent of the vibration direction. If a rotation of the belt drum 2 occurs at the same time as the deflection of the pendulum brake, the braked coupling disc 8 is displaced against the toothed disc 7 so that it engages the same thereby blocking the belt drum 2.

Figure 2:
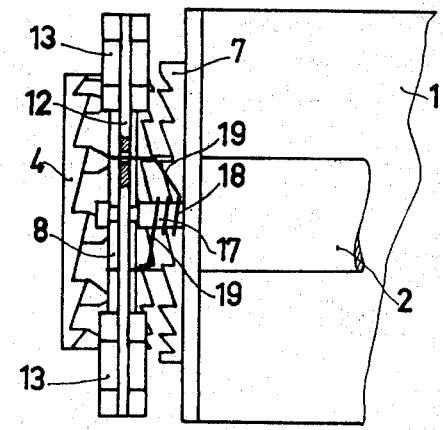
FIG. 2 is a top view of the device of FIG. 1.
Figure 5:
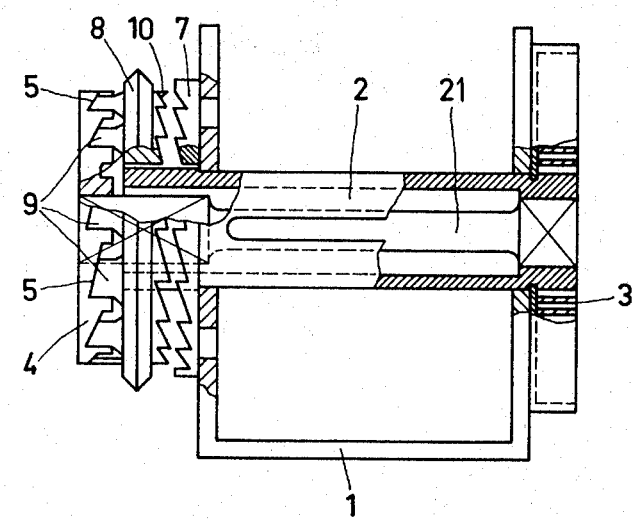

In the embodiment according to FIG. 5, the belt drum 2 is connected, in contast to the embodiment of FIGS. 1 and 2, not directly with the blocking disc 4 but, rather, via a torsion rod 21 which extends in the hollow space of the belt drum 2. The embodiment in FIG. 5 utilizes a pendulum brake as in the embodiment of FIGS. 1–4. However, the pendulum brake is not shown in FIG. 5. In the embodiment of FIG. 5, when danger occurs, the torsion rod 21 twists into itself and the kinetic energy of the body of the occupant strapped in by the belt which acts upon the belt 3, is consumed for the most part by irreversible deformation so that the load which acts against the body corresponds merely to the low residual energy.

I claim:

1. Automatic winding device for safety belts in a motor vehicle to protect occupants comprising a housing fixedly mounted in the vehicle, a toothed disc secured to said housing; a belt drum rotatably mounted in said housing for unwinding a belt wound thereon; a blocking disc coupled to said drum for rotation therewith, and having an end face, said blocking disc comprising a set of teeth on said end face symmetrically disposed about the axis of rotation of said drum, said blocking disc having a plurality of engagement bevels disposed between said teeth respectively; a coupling disc rotatably mounted coaxially to said belt drum between said toothed disc and said blocking disc, said coupling disc having two end faces and comprising first and second sets of teeth symmetrically disposed about the axis of rotation of said drum on respective 0ones of said two end faces, said first set of teeth being engageable with said teeth of said blocking disc, said coupling disc being rotatable relative to and being movable axially relative to said blocking disc, said second set of teeth of said coupling disc being engageable with said toothed disc of said housing to prevent further rotation of said coupling disc; and a pendulum brake disposed at the periphery of said coupling disc, said pendulum brake comprising a brake ring disposed in surrounding relation to said coupling disc, pendular bearing means for pendulously supporting said brake ring, and brake means disposed on said ring, whereby said brake means engage said coupling disc in response to sudden, sharp movements of the vehicle to cause said coupling disc to rotationally lag said blocking disc, whereupon said engagement bevels axially cam said coupling disc until said second set of teeth of said coupling disc engage said toothed disc of said housing therefor to block rotation of said coupling disc and thereby prevent rotation of said belt drum.

2. Automatic winding device of claim 1, the peripheral surface of said coupling disc being wedge-shaped, and said wedge-shaped surface having tooth-like contour.

3. Automatic winding device of claim 2, said tooth-like contour being a serration.

4. Automatic winding device of claim 1, said brake means comprising two brake shoes disposed symmetrically with respect to said coupling disc and engageable therewith, each of said brake shoes having a braking surface of mating contour to the peripheral surface of said disc.

5. Automatic winding device of claim 4, said brake shoes being made of elastic material.

6. Automatic winding device of claim 1, said pendular bearing means comprising a horizontally extending opening in said brake ring, said opening being a pendular bearing, a bearing rod attached to said housing and extending into said opening, said rod being in parallel spaced relation to the axis of said belt drum, and a spiral spring disposed on said rod, said spring having ends extending to respective sides of said bearing to grip said ring and spring support the same.

7. Automatic winding device of claim 6, said ring having pendular weights attached thereto.

8. Automatic winding device of claim 1, comprising a torsion rod for absorbing energy developed by a sudden force applied to the belt, said torsion rod being connected between said belt drum and said blocking disc.

9. Automatic winding device of claim 8, said belt drum having hollow central region, said torsion rod being disposed in said region.

10. Automatic winding device of claim 1, comprising a torsion rod for absorbing energy developed by a sudden force applied to the belt, said torsion rod being connected between said belt drum and said blocking disc.

* * * * *

PO-1050
(5/69)

UNITED STATES PATENT OFFICE
CERTIFICATE OF CORRECTION

Patent No. 3,802,642                    Dated April 9, 1974

Inventor(s) WOLF-DIETER KLINK

It is certified that error appears in the above-identified patent and that said Letters Patent are hereby corrected as shown below:

In the heading to the printed specification, line 8,

"Nov. 30, 1971     Germany......2058883" should read,

--Nov. 30, 1970    Germany......P 20 58 883.4--.

Line 9, "Dec. 31, 1971    Germany.....2064710" should read

--Dec. 31, 1970    Germany.....P 20 64 710.3--.

Signed and sealed this 19th day of November 1974.

(SEAL)
Attest:

McCOY M. GIBSON JR.                C. MARSHALL DANN
Attesting Officer                  Commissioner of Patents